7-135

SEARCH ROOM

June 14, 1955 J. SCHMIDINGER Re. 24,023

SNAP ACTION DEVICE

Original Filed July 21, 1951 3 Sheets-Sheet 1

INVENTOR.
JOSEPH SCHMIDINGER

BY
Eyre, Mann & Burrows
ATTORNEYS

SNAP ACTION DEVICE

Original Filed July 21, 1951 3 Sheets-Sheet 2

INVENTOR.
JOSEPH SCHMIDINGER

BY
Eyre, Mann & Barrows
ATTORNEYS

SNAP ACTION DEVICE

Original Filed July 21, 1951 3 Sheets-Sheet 3

INVENTOR.
JOSEPH SCHMIDINGER

BY
Eyre, Mann & Burrows
ATTORNEYS

United States Patent Office

Re. 24,023
Reissued June 14, 1955

24,023

SNAP ACTION DEVICE

Joseph Schmidinger, Lake George, N. Y.

Original No. 2,615,106, dated October 21, 1952, Serial No. 237,958, July 21, 1951. Application for reissue May 3, 1954, Serial No. 427,406

26 Claims. (Cl. 200—114)

Matter enclosed in heavy brackets [ ] appears in the original patent but forms no part of this reissue specification; matter printed in italics indicates the additions made by reissue.

This invention comprises an efficient and simple snap action device of wide application.

The device may be employed for the control of electric circuits, for example as a relay, as a flasher, or as a circuit breaker, or it may be employed as a temperature responsive device. It may be actuated by electrical forces, by thermal forces, or by mechanical forces or by a combination thereof. The new device, irrespective of its particular application and of the particular actuating forces, comprises essentially three elements, namely, a disc, a laterally flexible pull wire or strip secured at its ends to the disc at opposite ends of a diameter, and a support [secured to the flexible strip and] positioned on the geometrical axis of the disc *and preferably secured to the center of the flexible strip* [but not fastened to the disc]. The disc is of spring material and has a crease or bend formed therein along the diameter thereof underlying the flexible strip, the strip extending along the convex side of the crease in the disc. The flexible pull strip may be continuous between the points of attachment to the disc [, in which case it is secured to the support means at its mid-section] or the strip may be in two parts. [, in which case one end of each section is secured to the support.] In either case the pull strip [is so] *may be* mounted on the support [as to be] under longitudinal tension and the support [is] *may be* so constructed as to permit of adjustment or of variation of the tension in the strip.

The disc under predetermined increase of tension in the pull strip, snaps from one position, that in which the halves of the disc on each side of the diametrical crease extend outwardly away from the [support] *pull strip* at an included angle of less than 180°, to a second position, one in which the disc is bowed in the opposite direction about a diameter of 90° to the preformed crease. [As the entire periphery of the disc is free to move, being unattached to any rigid part, and as the sole support of the device is the centrally located support means to which the pull strip is secured, uniform and positive snap action of the disc results. This will be explained in more detail hereinafter.]

When the device is to operate to open or close electrical contacts and is itself to carry current, the disc and strip are of metal and an electrical contact is secured to the center of the disc on either or both sides thereof, depending upon the circuit or circuits to be controlled and the location of cooperating fixed contacts. The flexible pull strip, in such an application, comprises an expansible pull wire which, when heated by passage of sufficient current therethrough, permits the disc to assume the form to which it is constrained by the diametrical crease therein but which when cold or when carrying a limited amount of current, causes the disc to snap and buckle in the opposite direction.

When the disc and pull strip are of material having the same coefficient of thermal expansion, its operation is not affected by the ambient temperature as both disc and pull strip will expand and contract together and this is a decided advantage for many applications of the device. When, however, response to ambient temperature is desired, as when the device is to be employed as a thermostat, the disc and pull strip are made of materials having different coefficients of thermal expansion, in which case by proper selection of the respective materials and of the initial tension in the flexible pull strip, positive snap action of the device in response to ambient temperature may be obtained.

As heretofore indicated, the sole support means for the device is centrally located and engages the pull strip only. The support in [each] *such* case includes means for adjusting the initial tension in the pull strip. This is the sole adjusting means required or wanted for the device. This feature is important as it avoids any stressing of the disc which inherently results when forces are applied directly to the disc during attachment of the strip or after such attachment. When the device is to be mechanically rather than thermally actuated, the tension in the pull strip is controlled by the support means which, in this case, is constructed to include such tension varying means as well as the means for initially adjusting the device.

For a better understanding of the new snap action device and of various fields of application thereof, reference may be had to the accompanying drawings, of which:

Figure 12:
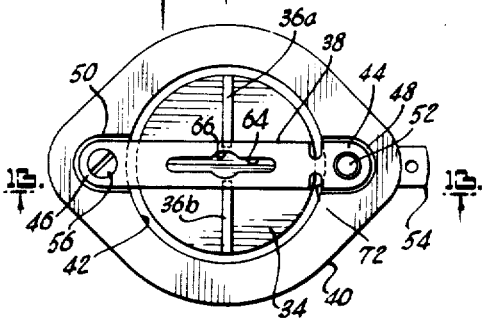
Fig. 12 is a top view of a switch structure embodying the invention.
Figure 13:
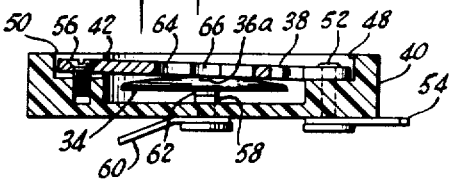
Fig. 13 is a cross-sectional view taken along the line 13—13 of Fig. 12.
Figure 14A:
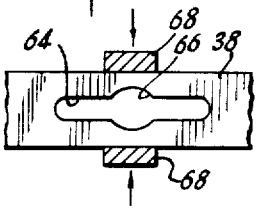
Figure 14B:
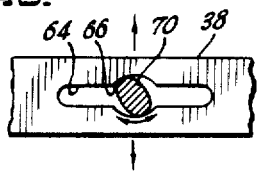
Figure 15:
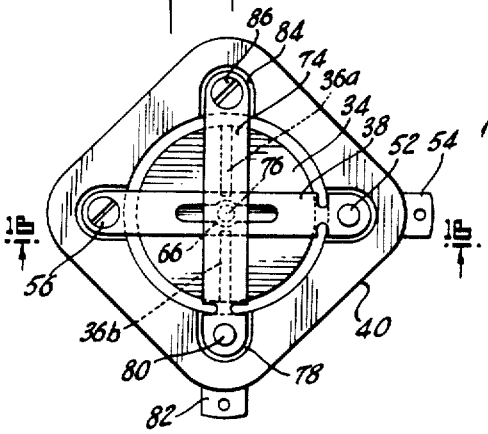
Figure 18:
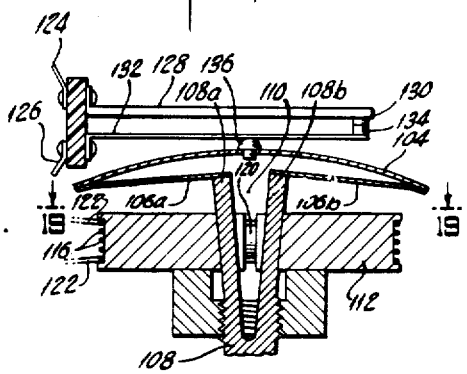
Figure 16:
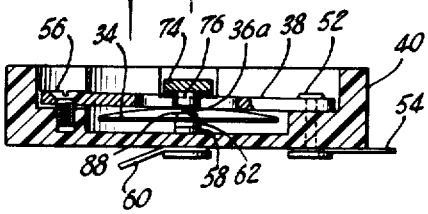
Figure 19:
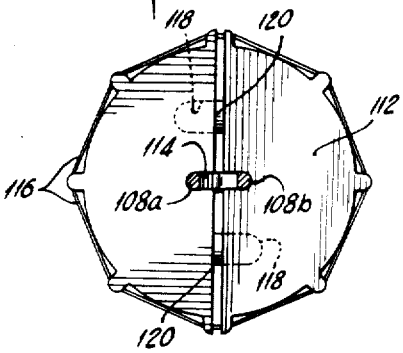
Figure 17:
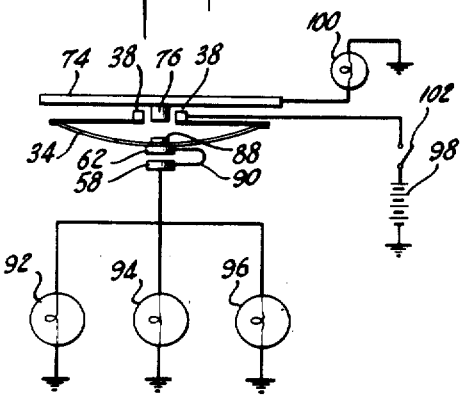
Figure 20:
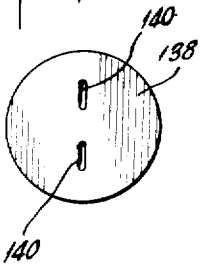
Figure 21:
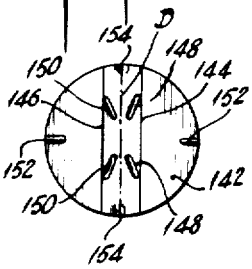

Figs. 14–A and 14–B are fragmentary views of the disc supporting means of the structure of Fig. 12 showing the method of adjustment thereof;

Fig. 15 is a top view of a switch structure similar to that of Figs. 12 and 13 but provided with two adjustable fixed contacts, one for engagement by a disc carried contact in one position of the disc and one for engagement by a disc carried contact in the other position of the disc;

Fig. 16 is a cross-sectional view taken on the line 16—16 of Fig. 15;

Fig. 17 is a diagrammatic view illustrating one application of the structure of Figs. 15 and 16;

Fig. 18 is a sectional view of the snap action device of the invention arranged for actuation of switch contacts in response to mechanical variation of tension in the pull strip;

Fig. 19 is a horizontal sectional view taken on the line [18—18] *19—19* of Fig. 18; and Figs. 20 and 21 illustrate other designs of constrained discs suitable for use in the snap action device of the invention.

Figure 1:
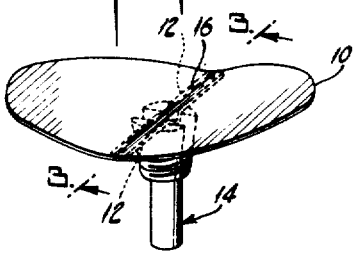
Fig. 1 is a top perspective view of one embodiment of the invention.
Figure 2:
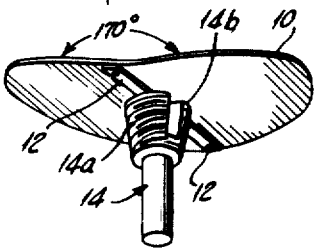
Fig. 2 is a bottom perspective view of the structure shown in Fig. 1.
Figure 3:
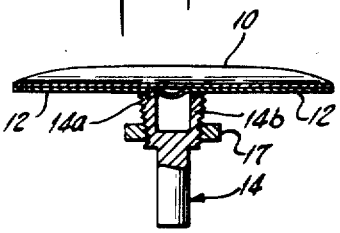
Fig. 3 is a cross-sectional view along the line 3—3 of Fig. 1.
Figure 6:
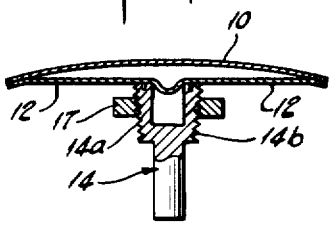
Fig. 6 is a cross-sectional view taken along the line 6—6 of Fig. 4.

Figs. 1 to 3 inclusive show a snap action device of the invention in the position corresponding to reduced tension in the pull strip. The disc of the device is indicated at 10, the flexible pull strip at 12 and the centrally disposed support generally at 14. The disc is of spring material, for example metal, and has a diametral crease 16 therein which is parallel to and convex toward the pull strip 12. The crease is preferably formed by bending the disc through its center line over a round edge having a small radium of curvature, the disc being preferably subsequently heat treated to permanize the constraint therein. The crease should be relatively shallow so that the dihedral angle formed at the crease lies between 135° and 180°, say 170°. The flexible pull strip 12 is secured at its ends to the periphery of the disc 10 adjacent the ends of the crease 16. The central section of the strip is secured to the support 14. The support 14 comprises a stud having an externally threaded end axially slotted to provide furcations 14a and 14b which, by means of a nut 17 threaded on the support, may be forced toward each other to reduce the width of the axial slot. The strip 12 is attached, as by welding or riveting, to the furcations 14a and 14b and these points of attachment to the furcations are equidistant from the points of attachment of the strip to the disc and are preferably effected while the furcations are most widely separated. After attachment of the strip 12 the nut 17 is turned to introduce the desired tension in the parts of the strip radiating from the support, thus introducing slack in the strip 12 intermediate the furcations, as indicated in Figs. 3 and 6. This arrangement provides a simple and effective means for adjusting the tension in the pull strip 12. When the nut 17 is rotated in a direction to move it closer to disc 10, it draws the furcations 14a and 14b closer and thereby increases the tension in the pull strip. When the nut is turned in the reverse direction the furcations or jaws move apart and reduce the tension in the pull strip.

Figure 4:
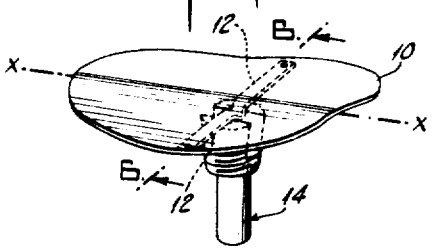
Fig. 4 is a top perspective view of the structure shown in Fig. 1 with the center of the disc buckled upwardly.
Figure 5:
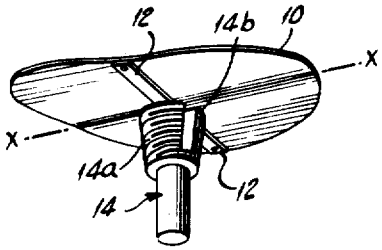
Fig. 5 is a bottom perspective view of the structure shown in Fig. 4.

Figs. 4 to 6 illustrate the device of Figs. 1 to 3 when in the position corresponding to increased tension in the pull strip. In this position the disc is buckled along a diameter indicated by the line X—X in Figs. 4 and 5, at 90° from the crease 16 and the center of the disc is displaced axially from the support.

The action of the disc in snapping from one position to the other under the influence of the tension exerted through the pull strip can be better illustrated by reference to Figs. 7 through 10, wherein the movement of the disc is shown exaggerated to facilitate explanation and understanding. Figs. 7 to 10 also illustrate the optimum positioning of a cooperating fixed element to be actuated by the snap action device. For convenience the support means are not shown in Figs. 7 to 10, nor that part of the strip 12 which is not under tension, namely, the section between the points of attachment to the furcations of the support.

An important aspect of this snap action device is that the disc 10 when forced to snap under tension of the pull strip, actually reverses its natural curvature with the greatest portion of such reversal occurring at the center of the disc. This results in the translation of practically all of the motive power of the pull strip into positive action at the center of the disc.

Another important aspect of the invention is that of a "locking" effect of the device in both positions of the disc. This results from a displacement of the disc through a so-called equilibrium position so that, as a disc snaps rapidly from the position shown in Fig. 1 to that shown in Fig. 4, the free edges of the disc swing downwardly while the center of the disc moves upwardly and at the same time the points on the periphery of the disc to which the pull strip is attached shift very little in comparison to either the free edges of the disc or the center thereof.

Figure 7:
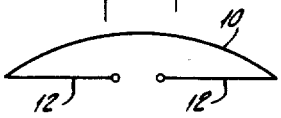
Figs. 7 to 10 are diagrammatic views explanatory of the action of the device and illustrating the optimum location of a cooperating contact or other element to be actuated by snap action of the device.

Fig. 7 is a substantial equivalent of Fig. 6, having the pull strip 12 in tension and the disc 10 snapped to its upward position. This position of the disc may be considered the normal at-rest position of the assembled device with the pull strip 12 in tension, assuming no cooperating fixed element to be actuated as, for example, a fixed contact to be engaged by a contact secured at the center of the disc.

Figure 8:
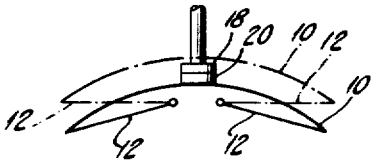

Fig. 8 shows the position of the pull strip 12 and disc 10 in dotted lines and is identical to the position of these elements as illustrated in Fig. 7. The solid line position of the pull strip 12 and disc 10 show their positions when a fixed element to be actuated, for example a contact 18, is positioned to engage an actuating element mounted at the center of the disc, for example a contact 20, when the pull strip 12 is under tension. It will be seen from this figure that when the fixed contact 18 is so positioned as to prevent the center of the disc from moving to the at-rest position indicated in dotted lines, the outer ends of the pull strip 12 extend downwardly from the central support. The position of the contact 18, with reference to the support, is an important factor in maintaining desired pressure between contacts 18 and 20 until the moment that the disc snaps into the other position.

Figure 9:
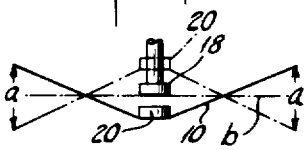

The manner in which this optimum position of the fixed element or contact 18 is determined may be seen in Fig. 9, which is a cross-sectional view of the device taken at right angles to the views shown in Figs. 7 and 8. In this figure the solid line position of the disc 10 is the equivalent of the position shown in Fig. 1 with the pull strip 12 under reduced tension and the free edges of the disc extending upwardly on each side of the fixed element 18. When the parts of the pull strip 12 are placed under tension the disc snaps to a reverse position with the free ends of the disc slanting downwardly and the disc carried element or contact 20 assuming an uppermost position. The ends of the disc in this action move through a distance indicated generally by the arrows "a." It has been found that by placement of the fixed element 18 generally in the vicinity of the center line "b" drawn between midpoints of the path of travel of the free ends of the disc, that the optimum pressure conditions at engagement and disengagement of the elements 18 and 20 are obtained, as well as an increase in the rapidity with which this engagement and disengagement is accomplished.

Figure 10:
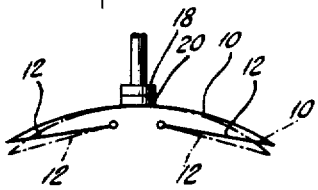

To illustrate the operation of the device, reference is made to Fig. 10 wherein the elements or contacts 18 and 20 are shown in engagement, element 18 being at the optimum position described with reference to Fig. 9. The dotted line position of the disc 10 and of the pull strip 12 illustrates the position of the disc and pull strip when the latter are under maximum tension and is identical to positions illustrated in solid lines in Fig. 8. When the tension in the pull strip decreases, whether due to expansion of the strip relative to the disc or to mechanical separation of the points of attachment of the strip to the support, the disc and pull strip move to the full line position shown in Fig. 10, at which position pressure between the elements or contacts 18 and 20 is still maintained. As the tension in the strip continues to decrease, a point is reached when the power of the disc overcomes the tension in the strip and the device snaps from a position of firm contact between elements 18 and 20 to the open position illustrated in Fig. 1. This action of the device in abruptly separating the elements 18 and 20 is of particular importance in avoiding arcing when those elements are electrical contacts.

The essential elements of the new snap action device and the operation thereof have so far been described without reference to any specific application, although the disc carried element and the actuated element of Figs. 7 to 10 have been illustrated as electrical contacts. These elements, however, are electrical contacts only when the device is incorporated in a circuit to be controlled thereby in response to expansion and contraction of the pull strip with increase and decrease of current therethrough. If the device is to be used, for example, as a thermostat, the disc and pull strip are of material having different thermal coefficients of expansion so that snap action of the device results from differential expansion of the parts with change in ambient temperatures. In such application of the invention the actuated element 18 may be any device adapted when actuated by engagement or disengagement to signify or control temperature conditions, the element 20 being suitably shaped to cooperate with the actuated element. For example, element 20 may be a button of insulating material and element 18 may be a spring arm carrying one of a pair of normally open contacts as in the arrangement illustrated in Fig. 18 hereinafter to be described.

Figure 11:
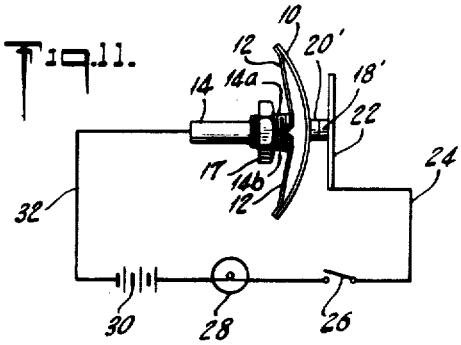
Fig. 11 is a diagram illustrating the snap action device of Figs. 1 to 6 connected for control of a lamp load circuit.

In Fig. 11 the snap action device of Figs. 1 to 6 is illustrated as a flasher for a load circuit, or as an overload protector, depending upon initial adjustment of the tension in the pull strip and upon the position of the fixed contact cooperating therewith. The device is shown with the disc 10 thereof in the position corresponding to maximum tension in the pull strip 12, and with a disc carried contact 20' in engagement with a fixed contact 18' positioned in the optimum position as described with reference to Fig. 9. The fixed contact 18' is connected through suitable supporting means 22 and wire 24 to one terminal of a control switch 26. The other terminal of the switch is connected through a lamp or other suitable load 28 to one side of a battery 30, the other side of the battery being connected by means of a lead 32 to the support 14 which in this embodiment of the invention is of metal. When switch 26 is closed, current will flow from the battery through support 14, pull strip or wire 12, disc 10, contact 20' carried thereby, contact 18', through switch 26 and load 28 to energize the load. With the pull strip under tension and the fixed contact positioned as above described, the device operates as a flasher. The load current is sufficient to heat the pull wire to the point where its expansion permits the disc to buckle and assume a position as shown in Figs. 1 to 3. This action separates contacts 18' and 20' to break the circuit, whereupon the pull wire cools. With the cooling and the attendant contraction, the disc will again buckle outwardly to close the contacts 18' and 20' and this alternate or flashing action will continue as long as the switch 26 is closed. If the device is to operate as an overload protector the nut 17 is turned to reduce the tension in the pull wires to such an extent that when the disc buckles into the contact open position due to excessive current through the device, the disc will remain in that position and hold the circuit open, there being insufficient tension in the pull wire to return the disc to the contact closing position once the disc has snapped through equilibrium position. After the disc has snapped to open the circuit, the disc can be reset, that is, snapped to contact closing position, by outward pressure applied to the center of the disc, as by manual operation of a tool inserted through the axis of support 14 which in this instance would be formed with a suitable axial passage therethrough.

Figs. 12 to 14 show a specific embodiment of the snap action device in a switch structure. In these figures the disc is denoted by the numeral 34. It is creased or bent along a diameter in the manner described in connection with Fig. 1. The pull strip in this embodiment of the invention is formed of two parts, indicated as flat wires 36a and 36b, which are fastened to the outer periphery of the disc by welding or the like, with their inner ends similarly fastened to a transverse bracket member 38 providing the entire support for the pull strip and the disc. The pull wires are alined with the diametral crease or deformation of the disc 34 and are on the convex side thereof.

The sub-assembly of the operating portions of the switch, namely, the disc 34, pull wires 36a and 36b, and bracket 38 are mounted within a thin recessed housing 40 of insulating material with the disc centrally disposed within a recess 42 and the ends 44 and 46 of the bracket 38 disposed within shallow recesses 48 and 50, respectively. The end 44 of the bracket 38 is firmly mounted within its recess 48 by a conductive rivet 52 extending through the housing and carrying one contact terminal 54 for the switch. The other end 46 of the bracket 38 is adjustably held in its recess by a screw 56. Centrally of the recess 42 in which the disc is disposed is a fixed contact 58 fixed to the housing 40 and connected with a lug 60 to form the second terminal for the switch. The contact 58 cooperates with a disc carried contact 62 to open and close the circuit between terminals 54 and 60.

In order to adjust the tension on the pull wires 36a and 36b to obtain the desired operation, the bracket member 38 is slotted at 64 with an enlarged central part 66. The tension adjustments are illustrated in Figs. 14–A and 14–B. Fig. 14–A shows the means for increasing the tension on the pull wires, which comprises a pair of jaws 68 to deform the bracket member 38 to narrow the recess 64. To decrease the tension a cam member 70 is inserted in the enlarged section 66 of recess 64 as shown in Fig. 14–B and rotated in position to widen the recess 66 the desired amount.

Adjustment of the spacing of contacts 58 and 62 is accomplished by the adjustment of the screw 56 holding one end of the bracket member 38 in the housing 40. The bracket member is recessed at 72 and bent slightly as shown in Fig. 13 so that the screw 56 pulls the end 46 of the bracket into place. The resiliency of the metal bracket 38 is sufficient to retain the adjusted contact setting and the degree of adjustment is sufficient to attain the optimum position of the fixed contact relative to the movable contact on the disc.

By the simple addition of a bracket carrying a centrally disposed contact, the structure of Figs. 12 and 13 can be modified for operation as a two-way flasher. Such an arrangement is illustrated in Figs. 15 and 16 wherein elements corresponding to elements of the structure of Figs. 12 and 13 are identified with the same reference numerals. The additional bracket, which is indicated at 74 and carries a contact 76 on the underside thereof, overlies the bracket 38 and is disposed at right angles thereto with the contact 76 positioned within the opening 66 in bracket 38. One end of bracket 74 is mounted in a recess 78 in the housing 40 by means of a rivet 80 which extends through the housing and serves as the electrical connection between the contact 76 and a terminal 82. The other end of bracket 74 which, like bracket 38, is sprung upwardly by bending at a weakened section adjacent the riveted end, is adjustably secured in a recess 84 of the housing by a screw 86. For cooperation with the contact 76, a contact 88 is centrally mounted on the disc 34 on the convex side of the crease therein. When the above described structure is to be connected for operation as a two-way flasher, the spacing of contacts 58 and 62 is adjusted to the correct position for maintenance of contact pressure up to the instant that the disc snaps to separate these contacts and to close contacts 88 and 76. The load circuits to be alternately flashed are connected to terminals 60 and 82, and terminal 54 is connected through a suitable switch to the source of energy.

It will be understood, of course, that the current drawn by the load circuit connected to terminal 82 should be less than that drawn by the load circuit connected to terminal 60 so that there will be alternate expansion and contraction of the pull wires and hence alternate flashing of the circuits as the disc snaps back and forth from one contact closing position to the other.

If the structure of Figs. 15 and 16 is to be used, for example as a load indicator, it is only necessary that contacts 62 and 58 be permanently electrically connected together, as by a light flexible conductor. Such an arrangement is illustrated in Fig. 17 wherein the operating parts of the structure are shown connected for indicating by a pilot lamp the condition of a lamp load circuit. In Fig. 17 the flexible conductor electrically connecting contacts 62 and 58 is indicated at 90 and three lamps, 92, 94 and 96 are shown connected in parallel between contact 58 and the negative terminal, indicated as ground, of a source of energy 98. A pilot lamp 100 is connected between the back contact 76 and ground and the bracket 38 supporting disc and pull wires is connected through a switch 102 with the positive terminal of the source 98. With this arrangement the position of fixed contact 58 is relatively unimportant. It would ordinarily be moved out of engagement with contact 62. The operation of the above described circuit is as follows: When switch 102 is closed current flows through the pull wires, disc, connector 90 and lamps 92, 94 and 96, assuming all lamps are in operating condition. The current through the pull wires under this assumed condition is sufficient to cause the pull wires to expand and permit the disc to snap to the position to which it is constrained by the crease therein, in which position contacts 88 and 76 engage and pilot lamp 100 is lighted. Lamps 92, 94 and 96 will remain lighted because of connection 90 and the disc will remain in back contact closing position until and unless one or more of the lamps 92, 94 and 96 fail. Upon such failure, the reduced current passing through the pull wires causes sufficient contraction of the wires to snap the disc into the illustrated position with contacts 88 and 76 out of engagement. Pilot lamp 100 will thereby be extinguished, indicating failure of one or more of the lamps of a load circuit. The device may be made sensitive enough to respond to a relatively small change in load current so that failure of any one of a group of lamps can be promptly indicated by extinguishment of the pilot lamp.

In the arrangement diagrammatically illustrated in Fig. 17, should the pull wires, when expanded in normal back contact closing position of the disc, be short-circuited by the disc, they would cool and contract and cause the disc to snap into contact open position, thus extinguishing the pilot lamp and giving a false indication of lamp failure. Such false indication can be avoided by adjustment of contact 76 into a position to provide a stop preventing the disc from assuming its fully constrained position. Furthermore, as the disc itself is of resilient material and as the maximum tension is applied thereto at the points of attachment of the pull wires, the disc flexes slightly at these points in a direction tending to space the wires from the disc surface and hence to minimize the possibility of short-circuit of the wires by the disc. In applications where the pull strip does not carry current when the disc assumes the position to which it is constrained by the crease therein, short-circuiting of the pull strip by the disc is often advantageous as it accelerates cooling of the strip and prevents burning out thereof should the device be inadvertently connected across an excessively high voltage.

In the particular [applications] *embodiments* heretofore described, the snap action of the device has been occasioned by expansion of the pull strip under the influence of heat, either as a result of the passage of current therethrough or as a result of change in ambient temperature. In Figs. 18 and 19, to which reference may now be had, snap action of the device occurs as the result of change in tension applied mechanically to the pull wires. In this embodiment of the invention the disc is indicated by the reference numeral 104 and the pull strip by sections 106a, 106b. The outer ends of the pull strip parts are connected to opposite ends of the diameter of the disc 104 as in previous embodiments of the invention along the convex side of the crease therein. The inner ends of the pull strips are secured to a support member 108 having a V-shaped slot 110 therein forming jaws 108a and 108b to which the strips are connected. The support member 108 is of spring material and the jaws have a constraint therein tending to move them apart. A drum 112 split into two semi-cylindrical sections and having an axial slot 114 therein for reception of the jaws 108a and 108b carries a circumferential coil 116 of expansible wire, which coil holds the halves of the drum together and is under sufficient tension to force the jaws 108a and 108b toward each other and thereby introduce tension into the strips 106a, 106b. To assure alinement of the halves of the drum with movement thereof toward and away from each other, a recess 118 is formed in each drum half for reception of a pin 120 carried by the other drum half. When the current is passed through the coil 116, as from leads 122, the expansion of the wire forming the turns of the coil relaxes the pressure between the halves of the drum 112 and permits the jaws 108a and 108b to move apart sufficiently to reduce the tension in the pull strip and permit the disc 104 to snap into its normal constrained position. The snap action of the device resulting from the mechanical change in tension in the pull strip may be employed for actuation of any external device. In the particular embodiment of the invention illustrated in Fig. 18 the device is arranged for opening and closing an external circuit in response to the current in the expansible coil 116. The device may therefore be considered as a relay. The external circuit is illustrated diagrammatically in Fig. 18 as comprising leads 124 and 126 connected, respectively, to an arm 128 carrying a fixed contact 130 and a spring arm 132 carrying a contact 134, the tension in the spring arm 132 tending to open the contacts 130 and 134. An insulating button 136 carried centrally by the disc 104 on the concave side of the crease therein engages spring arm 132 when the disc is in the position corresponding to maximum tension in the strip parts 106a, 106b to force the spring arm into position to close contacts 130 and 134.

The above described arrangement is particularly adapted for use when relatively small currents and high voltages in the controlling circuit are to be encountered. It will be appreciated that but minor changes in position of the jaws 108a and 108b are sufficient to cause operation of the switch. It will also be understood that whether the increase and decrease in tension in the pull strip is occasioned by mechanical movement of the inner ends of the pull strip as in this embodiment of the invention, or as a result of heating and cooling as in the earlier described [application] *embodiments*, a change in the distance between the points of attachment of the pull strip to the disc occurs.

The disc of the snap action device of the invention may have its inherent constraint introduced in a variety of ways. The constraint may result from the formation of the disc of a diametral crease as heretofore described and such is the preferred arrangement. It is not necessary, however, that the crease occupy but a minimum medial portion of the disc as a wider but shallower crease or trough could be employed. For example, two creases equally spaced on opposite sides of a diameter could be provided, in which case the section between the creases would be relatively flat, or the diametral crease or channel could be interrupted at its center to provide a flat portion upon which a contact or other operating *element* could be mounted. Also the central crease or channel could terminate short of the periphery of the disc to provide flat surfaces for attachment of the ends of the pull wire. In some instances it might be advisable to provide strengthening ribs or ridges symmetrically disposed on opposite sides of a diameter and between constraining creases for focusing the buckling forces toward the center of the disc. In Figs. 20 and 21 two different designs of disc suitable for use in the snap action device of the invention in place of the singly creased disc heretofore described are illustrated. In Fig. 20 is indicated a disc 138 having a diametral crease 140 which terminates short of the periphery of the disc and is interrupted at the center of the disc. This provides relatively bendable areas at the center of the disc and at the periphery adjacent the points of attachment of the pull means. The increased flexibility of the disc at the points of attachment of the pull strip tends to prevent short-circuiting of the strip by the disc when the strip is fully expanded as discussed with reference to the arrangement illustrated in Fig. 17. In Fig. 21 a disc 142 is indicated which has crease lines 144 and 146 symmetrically disposed on opposite sides of the diameter D of the disc parallel to the pull strips (not shown). Intermediate the crease lines 144 and 146 are stiffening depressions 148 and 150 which extend radially and symmetrically with respect to the diameter of the disc. These depressions 148 and 150 terminate short of the center of the disc and short of the periphery and serve as reinforcement of the central section between the crease lines 144 and 146. It will be understood that the view of the disc 142 shown in Fig. 21 is that taken from the concave side of the crease lines. The disc 142 is also provided with short upraised ridges 152 extending from the periphery along the diameter disposed at 90° from the diameter D. These ridges 152 assist, when the disc is snapped, in localizing the position of the opposite fold in the disc. The disc 142 with its crease lines, depressions and ribs may conveniently be formed by stamping from a die. Conveniently short and narrow depressions 154 at opposite ends of the diameter D may be simultaneously formed for providing points of attachment for the ends of a pull strip which, as will be understood, will be secured to the disc along the underside of the disc as viewed in Fig. 21. The depressions 154 also serve to space the pull strip from the disc and thereby tend to prevent short-circuiting thereof by the disc.

*Various embodiments of the* [The] snap action device of the invention comprising essentially the diametrically constrained disc, the laterally flexible pull strip or wire, and the central support to which the pull strip is secured and by which it is tensioned, *have* [has] now been described. *It will be apparent that in the case of the thermally actuated snap action device, the only active elements are the diametrically deformed disc and the tensioned pull means. The support is a passive element which, in each case, has been described as including means for adjusting the initial tension in the pull means. Obviously the active elements, if in proper adjustment, will operate as described, irrespective of how supported.* The snap action of the device occurs as a result of change in tension in the pull strip. When the device is thermally actuated, whether by passage of current therethrough or by changes in ambient temperature, the tension change in the pull strip is caused by expansion or by contraction of either the pull strip or of the disc, depending upon the particular materials employed and their relative dimensions. When the disc is mechanically actuated the change in tension in the pull strip occurs as a result of change in overall length of the pull strip and hence to avoid response to ambient temperature the disc and pull strip in this case should be preferably of material having similar thermal coefficients of expansion. Thus the dimensions of disc and pull wire together with the specific materials of which they are formed depend upon the particular use to which the device is to be put. For a switch, for example, a nickel alloy containing at least 90% nickel, is recommended for use both for the disc and for the pull wire. The disc may have a diameter of ⅞" and a thickness of .005" and the pull strip may be 1/16" wide and .003" thick. A switch of such dimensions and of such material is suitable for use, for example, as a flasher for automobile direction signal and stop lights. A snap action device of the same order of dimensions but with the disc of Invar (nickel steel containing 36% nickel) and the pull strip of nickel or with the disc of nickel and the pull strip of Invar is suitable for use as a thermostat. Larger and smaller discs and pull wires may of course be employed.

This application is a continuation in part of abandoned U. S. applications Serial No. 543,623, filed July 6, 1944 for "Thermal Control Means" and Serial No. 174,411, filed July 18, 1950 for "Thermal Device for Circuit Control."

I claim:

1. A snap action device comprising a disc of resilient material having an inherent diametral deformation therein, laterally flexible pull means secured to the disc at opposite ends of the deformation therein and extending along the convex side thereof, and means disposed adjacent the center of the disc and secured to said pull means for supporting the device and tensioning the pull means, said disc being wholly supported by said pull means.

2. The combination with the snap action device according to claim 1, of a separately supported element positioned on the axis of the disc and on the concave side of the deformation therein for engagement by the disc when the disc is buckled under the tension of the pull means into a position wherein it is curved concavely toward the central support about a diameter 90° to the diametral deformation.

3. The combination according to claim 2 wherein said element is positioned to limit the movement of the center of the disc during buckling thereof.

4. The combination according to claim 3 including an element centrally mounted on said disc on the concave side of the deformation therein for actuating said first mentioned element by engagement therewith.

5. The combination according to claim 4 wherein said elements are electrical contacts, said disc is of metal and said pull means is of expansible wire adapted upon passage of current therethrough to expand and reduce the tension therein.

6. The snap action device according to claim 1 including means associated with said central support means for varying the tension in said pull means.

7. The snap action device according to claim 1 wherein said pull means comprises two flexible strips each connected at one end to the disc, the other ends of said strip being connected to different points on said support means, and means for varying the spacing between the points of connection of the strip to the support means to vary the tension in the pull strips.

8. The snap action device according to claim 1 wherein the disc and pull means are of material having the same coefficient of thermal expansion whereby the tension in the pull strip is independent of the ambient temperature.

9. The snap action device according to claim 1 wherein the disc and pull means are of material having different coefficients of thermal expansion whereby the tension in the pull strip varies with the ambient temperature.

10. A snap action device comprising a disc having an inherent diametral deformation therein tending to cause it to assume a constrained shape, a support element having laterally flexible pull means fastened thereto and radiating out therefrom, the outer ends of said pull means being fastened to points of said disc at opposite ends of the deformation therein and on the convex side thereof whereby when the tension in said pull means is reduced the center of the disc snaps in one direction to assume its constrained shape and when the tension in said pull means increases the snap action of the center of the disc occurs in the other direction.

11. A snap action device according to claim 10 including means associated with said support means for operating upon the central portion of the pull means to vary the tension thereof to snap the disc from one position to another.

12. The snap action device according to claim 10 wherein said pull means and disc are of electrical conducting material and the tension in said pull means is varied by differential expansion and contraction of said pull means and disc with passage of current therethrough.

13. The snap action device according to claim 10 wherein said pull means and disc are of material having different coefficients of thermal expansion and the tension in the pull means is varied by differential expansion and contraction of the pull means and disc with changes in ambient temperature.

14. The combination with the snap action device according to claim 10, of a separately supported element positioned on the axis of the disc and on the convex side of the deformation therein for engagement by the disc when the center of the disc snaps in the direction to assume its constrained shape as a result of reduction in tension in the pull means.

15. A snap action device comprising a controlling metallic disc-like member having an initial constraint incorporated therein tending to cause it to assume the constrained shape, a support element having pull wire means fastened to the end thereof and radiating out therefrom, the outer ends of said pull wire means being fastened to spaced points of said disc, said points being on the opposite sides of the center of the disc and so arranged with respect to the disc that when the pull wire means expand the center of the disc moves with a snap action in one direction and when the pull wire means contract a snap action of the disc center occurs in the other direction.

16. The device according to claim 15 wherein said pull wires are of material having a coefficient of thermal expansion differing substantially from the coefficient of thermal expansion of the metallic disc-like member whereby differential expansion and contraction of said disc and pull wires under changes in the ambient temperature causes snap action of the disc center and wherein said support means are adjustable for varying the tension in said pull wires.

17. A thermal switch device comprising a support, a buckling member having a portion adapted to occupy two different positions for operating a circuit opening and closing contact, and linear [expansion] *expansible* pull means carried by said support and fastened at two spaced points to said buckling member to control the buckling thereof to cause said portion to occupy one of said positions responsively to current flowing through the expansible means, and said buckling member being carried by said expansible pull means, the buckling member being the the form of a constrained disc with the outer ends of the expansible means fastened to one side of the disc at diametrically opposite points adjacent its periphery.

18. A thermal switch device comprising a support, a buckling member having a portion adapted to occupy two different positions for operating a circuit opening and closing contact, and linear expansible pull means carried by said support and fastened at two spaced points to said buckling member to control the buckling thereof to cause said portion to occupy one of said positions responsively to current flowing through the expansible means, and said buckling member being carried by said expansible pull means, the buckling member being a disc of comparatively thin spring metal doubly constrained by having a transverse bend formed therein and by the pull of the expansible means fastened at its ends to the convex side of said bend.

19. A thermal switch device comprising a support, a buckling member operating a circuit opening and closing contact and linear expansible pull means carried by said support and fastened at two spaced points to said buckling member to control the buckling thereof responsively to current flowing through the expansible means and said buckling member being carried by said expansible pull means and the latter comprising two parts disposed in line with each other and said support comprising two relatively adjustable portions to which are fastened respectively the inner ends of the expansible pull parts.

20. A circuit controller comprising a disc having a diametrical crease and carrying a contact at the center of the concave side, a pair of expansible and contractible wires having outer ends fastened at opposite points on the periphery of the disc, a supporting means disposed at the center of the convex side of the disc with the other ends of said wires being secured thereto to wholly support the disc and a fixedly mounted contact positioned in operable relationship with the first said contact.

21. A snap action device comprising a diametrically creased disc, an element centrally mounted on the concave side of the disc, a pair of radially disposed expansible and contractible strips on the convex side of the disc in alinement with the diametrical crease and fastened at their outer ends to the periphery of the disc, centrally disposed supporting means positioned on the convex side of the disc with the inner ends of the strips secured thereto to wholly support the disc, and a fixed element mounted in cooperating relationship with the disc carried element.

22. A snap action switch comprising a disc-like plate of resilient material creased along a central line to displace the portions of the plate on each side of the line to form an included angle of less than 180°, a contact mounted on the center of the concave side of the plate, a pair of radially disposed pull wires on the convex side of the plate in alinement with said line and fastened at their outer ends to the edges of the plate, and centrally slotted supporting means on the convex side of the plate with the inner ends of the pull wires fastened thereto on each side of the slot, the width of the slot being adjustable to control the tension on the pull wires.

23. A thermal switch device comprising a support, a substantially circular buckling member carrying a contact and having an inherent constraint tending to move said contact through a dead center position to occupy a circuit controlling position and linear expansible pull means carried by said support and fastened to said buckling member at two spaced points on the opposite sides of a transverse line passing through said contact to control the buckling thereof responsively to current flowing through the expansible means and said buckling member being carried by said expansible pull means.

24. In a thermal switch device of the character set forth in claim 23 wherein the support comprises two adjustable parts and said linear expansible pull means comprises two parts fastened respectively to the adjustable support parts.

*25. In a snap action device the combination comprising a disc-like member of resilient material having a preformed crease therein along a single diameter only to provide a single position of stable conformation in which the portions of the member on each side of the diameter form an included angle of less than 180°, and an elongated pull member laterally flexible relative to the surface of said disc-like member and secured under tension to said disc-like member only at opposite ends of the crease therein and extending parallel to and overlying such crease along the convex side thereof, said disc-like member, depending upon the tension in said elongated pull member, being either in said position of stable conformation or in a position wherein it is curved oppositely thereto and about a diameter 90° to said crease, said disc-like member snapping through a neutral planar position from the position of stable conformation to the oppositely curved position in response to increase in tension in said pull member and snapping through the neutral planar position to the position of stable conformation from the oppositely curved position with decrease in tension in the pull member.*

*26. In a current responsive snap action device, a disc-like member of resilient electrically conductive material having a preformed crease along one diameter only to provide a single stable conformation in which the portions of the disc-like member on each side of the diameter form an included angle of less than 180°, and a flexible ribbon of electrically conductive material fixed to the disc-like member only at opposite ends of said diameter and overlying said diameter on the convex side*

*of the crease, said disc-like member, depending upon the tension in said ribbon being either in the said position of stable conformation or in a position wherein it is bent oppositely thereto and about a diameter 90° to said preformed crease whereby differential expansion and contraction of said ribbon and disc-like member with passage of current therethrough changes the tension in said ribbon and causes snap action of said disc-like member through a neutral planar position from one to the other of said first mentioned positions.*

References Cited in the file of this patent or the original patent

UNITED STATES PATENTS

| | | |
|---|---|---|
| 1,669,531 | Mottlau | May 15, 1928 |
| 1,680,429 | Mottlau | Aug. 14, 1928 |
| 1,715,662 | Lasky | June 4, 1929 |
| 1,784,450 | Klahn | Dec. 9, 1930 |
| 1,872,205 | Winger | Aug. 16, 1932 |
| 2,024,362 | Hoopes | Dec. 17, 1935 |
| 2,041,775 | Mottlau | May 26, 1936 |
| 2,166,238 | Davis | July 18, 1939 |
| 2,253,552 | Burch | Aug. 26, 1941 |
| 2,266,537 | Elmer | Dec. 16, 1941 |
| 2,267,164 | Newton | Dec. 23, 1941 |
| 2,615,106 | Schmidinger | Oct. 21, 1952 |

FOREIGN PATENTS

| | | |
|---|---|---|
| 47,975 | Norway | June 2, 1930 |